(12) United States Patent
Meyer et al.

(10) Patent No.: US 9,192,990 B2
(45) Date of Patent: Nov. 24, 2015

(54) PREPARATION OF A COMPONENT FOR USE IN A JOINT

(75) Inventors: Jonathan Meyer, Bristol (GB); Daniel Johns, Bristol (GB); Andrew Henstridge, Bristol (GB)

(73) Assignee: Airbus Operations Limited, Bristol (GB)

( * ) Notice: Subject to any disclaimer, the term of this patent is extended or adjusted under 35 U.S.C. 154(b) by 1691 days.

(21) Appl. No.: 12/449,552

(22) PCT Filed: Mar. 4, 2008

(86) PCT No.: PCT/GB2008/050152
§ 371 (c)(1),
(2), (4) Date: Aug. 13, 2009

(87) PCT Pub. No.: WO2008/110835
PCT Pub. Date: Sep. 18, 2008

(65) Prior Publication Data
US 2010/0068464 A1   Mar. 18, 2010

(30) Foreign Application Priority Data
Mar. 13, 2007  (GB) ................... 0704753.3

(51) Int. Cl.
*B22F 3/105* (2006.01)
*B22F 3/24* (2006.01)
(Continued)

(52) U.S. Cl.
CPC ............. *B22F 3/1055* (2013.01); *B22F 3/24* (2013.01); *B22F 5/00* (2013.01); *B22F 7/04* (2013.01);
(Continued)

(58) Field of Classification Search
CPC ... F16B 15/0007; F16B 5/07; B29C 67/0051; B29C 67/0074; B29C 67/0077; B29C 67/0092; B22F 3/1055

USPC ............. 264/497; 16/384; 411/458, 461, 493, 411/921; 156/219
See application file for complete search history.

(56) References Cited

U.S. PATENT DOCUMENTS 5,314,003 A * 5/1994 Mackay ........................ 164/494
7,225,044 B2 * 5/2007 Hiatt et al. .................... 700/119
(Continued)

FOREIGN PATENT DOCUMENTS

EP    1 741 952    1/2007
EP    1 760 384    3/2007
(Continued)

OTHER PUBLICATIONS

"Artifiical Disc Replacement" acquired from http://www.knowyourback.org/Pages/Treatments/SurgicalOptions/ArtificialDiscReplacement.aspx on May 18, 2014.*
(Continued)

*Primary Examiner* — Gerard Higgins
(74) *Attorney, Agent, or Firm* — Nixon & Vanderhye P.C.

(57) ABSTRACT

A method of preparing a component (60) to be joined to another component (55). The method comprises growing an array of projections (56, 57) on a bond region of the component (55) in a series of layers, each layer being grown by directing energy and/or material from a head to selected parts of the bond region. The joint may be used to join a pair of structural components, for instance in an aerospace application. For instance the joint may be used to join a reinforcing plate, floating rib foot, or stringer to a panel such as a wing or fuselage cover. Alternatively the joint may be used to join adjacent layers in a laminate structure.

9 Claims, 17 Drawing Sheets

(51) Int. Cl.
  *B22F 7/04*   (2006.01)
  *B29C 65/00*  (2006.01)
  *B29C 65/64*  (2006.01)
  *B23K 15/00*  (2006.01)
  *B23K 26/34*  (2014.01)
  *C09J 5/02*   (2006.01)
  *F16B 5/07*   (2006.01)
  *B23K 26/32*  (2014.01)
  *B22F 5/00*   (2006.01)

(52) U.S. Cl.
  CPC ........... *B23K 15/0086* (2013.01); *B23K 26/322* (2013.01); *B23K 26/3206* (2013.01); *B23K 26/328* (2013.01); *B23K 26/3246* (2013.01); *B23K 26/34* (2013.01); *B29C 65/64* (2013.01); *B29C 66/30321* (2013.01); *B29C 66/742* (2013.01); *C09J 5/02* (2013.01); *F16B 5/07* (2013.01); *B22F 2005/005* (2013.01); *Y10T 428/24008* (2015.01); *Y10T 428/24521* (2015.01)

(56) References Cited

U.S. PATENT DOCUMENTS

| | | |
|---|---|---|
| 2002/0043711 A1 | 4/2002 | Akram |
| 2003/0006217 A1 | 1/2003 | Dance |
| 2003/0098499 A1 | 5/2003 | Akram |
| 2004/0158343 A1* | 8/2004 | Hiatt et al. .................... 700/118 |
| 2006/0005362 A1 | 1/2006 | Arzt |
| 2006/0163222 A1 | 7/2006 | Dance |

FOREIGN PATENT DOCUMENTS

| | | |
|---|---|---|
| JP | 59 085392 | 5/1984 |
| WO | WO 96/33837 | 10/1996 |
| WO | WO 01/93786 | 12/2001 |

OTHER PUBLICATIONS

Search Report for GB 0704753.3, date of search Sep. 18, 2007.
International Search Report for PCT/GB2008/050152 mailed Jun. 16, 2008.

* cited by examiner

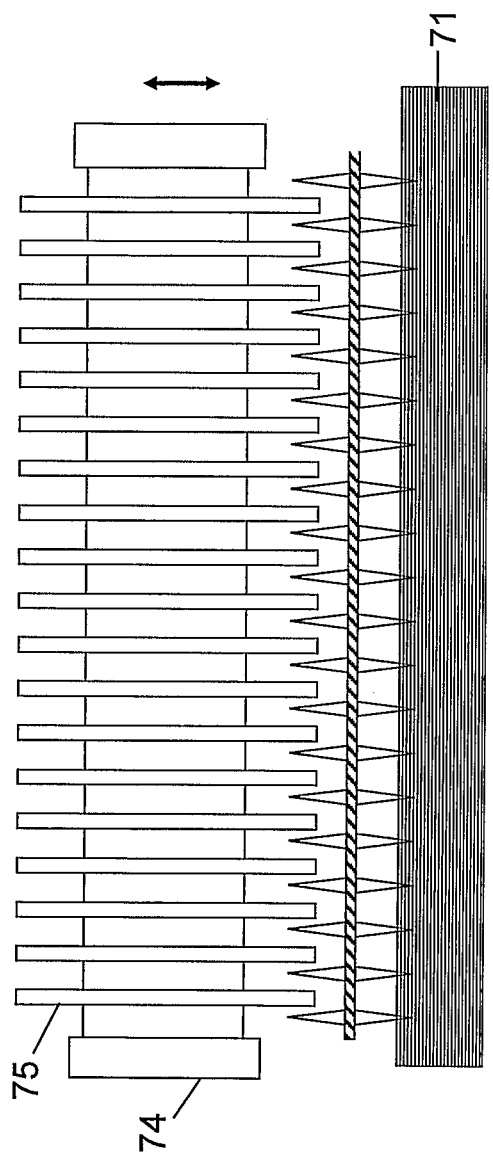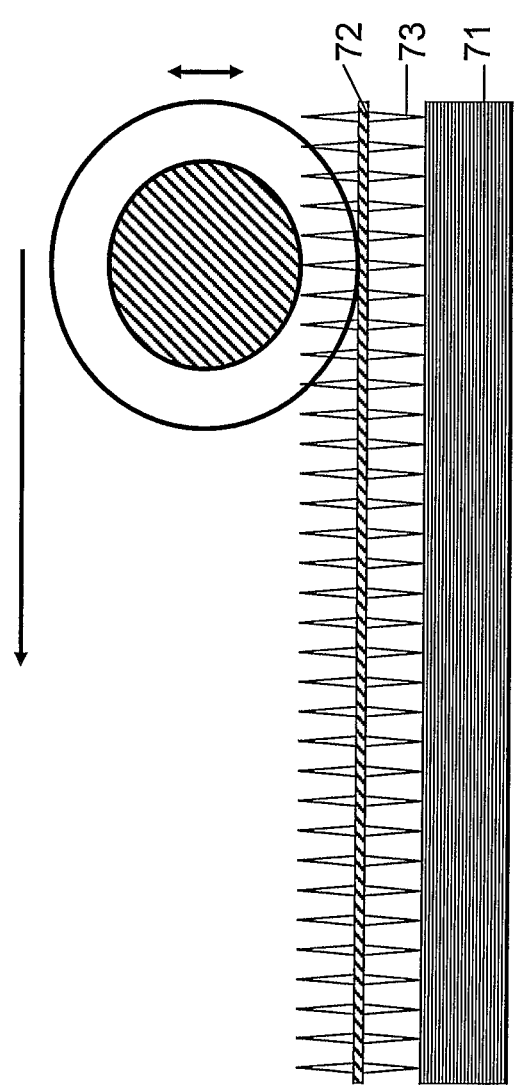

PREPARATION OF A COMPONENT FOR USE IN A JOINT

This application is the U.S. national phase of International Application No. PCT/GB2008/050152 filed 4 Mar. 2008 which designated the U.S. and claims priority to British Patent Application No. 0704753.3 filed 13 Mar. 2007, the entire contents of each of which are hereby incorporated by reference.

FIELD OF THE INVENTION

The present invention relates to a method of preparing a component to be joined to another component; a component prepared by such a method; and a joint including such a component.

BACKGROUND OF THE INVENTION

Joining between composite and metallic or thermoplastic components is currently approached in a number of ways, each with its own limitations.

The use of fasteners is commonplace but tends to result in de-lamination around fastener holes, as well as the associated difficulties of drilling holes in composites such as Carbon Fibre and Aramids such as Kevlar.

The bearing strength of laminated composites tends to be low, as does the inter-laminar shear strength. This results in a requirement for significant reinforcement around fastener holes, leading to a large weight increase, which is particularly undesirable in aerospace applications.

Fastened joints tend to be particularly weak in the pull-through direction (that is, the direction of axial load through the fastener) and as such are not well suited to aerospace applications such as fastening ribs to covers, where air and fuel pressure loads tend to result in significant axial component of load through the fastener.

Adhesive bonds are an increasingly common means of joining metallic components to composite laminates, however these perform poorly in peel, tension and cleavage, and tend to fail with little or no warning. Their weakness in peel and in tension makes bonded joints similarly limited in their application within conventional aerospace structures. Any mitigation for the poor performance in peel or tension tends to result in large bond surface areas, with the associated weight penalties that go with this.

Existing research into the use of 'surface' features to improve the strength of metallic/composite joints is limited.

WO 2004/028731 A1 describes a method by which surface features are generated by using a 'power-beam' such as an electron beam, in order to 'flick-up' surface material on a metallic component to sculpt protruding features that are intended to increase bond surface area and improve bond strength when incorporated into the matrix of a co-cured laminate.

This process has certain limitations.

Firstly, the process displaces surface material to create the protruding features. This could lead to surface damage of the component, and is likely to generate crack initiators that will adversely affect the fatigue life of the parent part.

Secondly, the process does not provide scope for optimising the profile and shape of the protrusions, which could produce significant improvements in the performance of the joint—particularly in tension and peel.

Thirdly, the process is an additional step in the production of a component and as such has an adverse time and cost impact.

Fourthly, the method can only form protruding features with a relatively low aspect ratio.

SUMMARY OF THE INVENTION

A first aspect of the invention provides a method of preparing a component to be joined to another component, the method comprising growing an array of projections on a bond region of the component in a series of layers, each layer being grown by directing energy and/or material from a head to selected parts of the bond region.

A second aspect of the invention provides a method of joining a pair of components, the method comprising growing an array of projections on a bond region of a first component in a series of layers, each layer being grown by directing energy and/or material from a head to selected parts of the bond region; and joining the bond region of the first component to a second component such that the projections are embedded in the second component.

A third aspect of the invention provides a joint comprising a first component having a bond region with an array of projections; and a second component joined to the bond region of the first component, wherein the projections have been grown in a series of layers, each layer being grown by directing energy and/or material from a head to selected parts of the bond region.

The invention employs an additive fabrication technique to form the projections, instead of forming the projections by displacing surface material as in WO 2004/028731 A1. This reduces the risk of damaging the component. Also, by growing the projections in a series of layers, the shape of each layer can be selected to enable the profile of the protrusions to be optimised.

The layered fabrication method also permits the projections to be formed with a relatively high aspect ratio, which we define herein as the ratio between the height of the projection perpendicular to the bond region and its average width parallel to the bond region. Typically the aspect ratio is greater than 1, preferably it is greater than 2, and most preferably it is greater than 3. This can be contrasted with the projections described in WO 2004/028732 which have aspect ratios less than 1.

The head and the bond region may remain stationary during the growth process: for example the head may have a fixed array of lasers and/or nozzles which extend over the entire bond region and are modulated as required to directing energy and/or material to selected parts of the bond region. However more preferably the method further comprises causing relative movement between the head and the bond region. Preferably this relative movement is caused by moving the head, but it will appreciated that the relative movement may be caused by moving the component or by a combined movement of both parts.

Various additive fabrication techniques may be used, including techniques in which the head directs material to selected parts of the bond region, and techniques in which a series of beds of material are deposited on the bond region and the head directs energy to selected parts of each bed.

Examples of the former include fused deposition modelling (in which the head extrudes hot plastic through a nozzle) and powder feed fabrication (in which a laser beam directs energy to fuse a powdered material as it is delivered to the bond region). Advantages of these methods are that:

the amount of wastage of material in the fabrication process is minimized;

the projections can be made from a different material to the component; and the component can be rotated relative to the head during the fabrication process in order to form a complex shape.

Examples of the latter include stereolithography (in which a laser is used to cure selected parts of a bed of liquid photopolymer) and powder bed fabrication (in which a series of beds of powder are deposited on the bond region and selected parts of each bed are fused by a laser). Advantages of using the head to deliver energy to the selected parts of a previously deposited bed of material are that:

it enables the component and the array of projections to be formed together; and
unconsolidated parts of each bed can support successive beds, enabling relatively complex shapes to be formed.

Typically the projections are formed by fusing a powder, for instance in a powder bed process or a powder feed process.

The components may be joined by penetrating the second component with the array of projections. This may be achieved by moving the first component, the second component, or both.

The joint may be secured by hardening the second component after the array of projections has penetrated into it, or by using an intermediate adhesive layer between the two components. In the latter case the second component may also have a bond region with an array of projections formed by an additive fabrication method.

The projections may be symmetrical (for instance cylindrical or conical, and extending at right angles to the component) or at least one of the projections may be asymmetrical (for instance the projection(s) may lean to one side and/or may have a non-circular cross-section). Asymmetrical projections can be used to improve properties in a particular load direction.

The first component may be an interfacing element between two components. In this case the joint further comprises a third component joined to a second bond region of the first component, the second bond region having an array of projections formed by the method of the first aspect of the invention. The bond regions may be on opposite faces of the first component, on separate parts of a single face, or on adjacent faces.

The second component may be a laminar component formed in a series of layers. In this case, the projections reduce the risk of de-lamination compared with conventional fastener joints. Preferably the second component is a composite component such as a fibre-reinforced composite component.

The projections may be formed from a metallic material (for instance Titanium or stainless steel); a thermoplastic material such as polyetheretherketone (PEEK); or any other material which can be grown by the additive fabrication technique of the first aspect of the invention.

The projections may be formed from the same material as the first component and/or the second component, or they may be formed from a different material.

The joint may be used to join a pair of structural components, for instance in an aerospace application. For instance the joint may be used to join a reinforcing plate, floating rib foot, or stringer to a panel such as a wing or fuselage cover. Alternatively the joint may be used to join adjacent layers in a laminate structure.

BRIEF DESCRIPTION OF THE DRAWINGS

Embodiments of the invention will now be described with reference to the accompanying drawings, in which:

FIG. 14 is an end view showing in initial step in a method of fabricating the fibre-metal laminate;
FIG. 15 is a side view showing the method of fabricating the fibre-metal laminate.

DETAILED DESCRIPTION OF EMBODIMENTS

Figure 1:
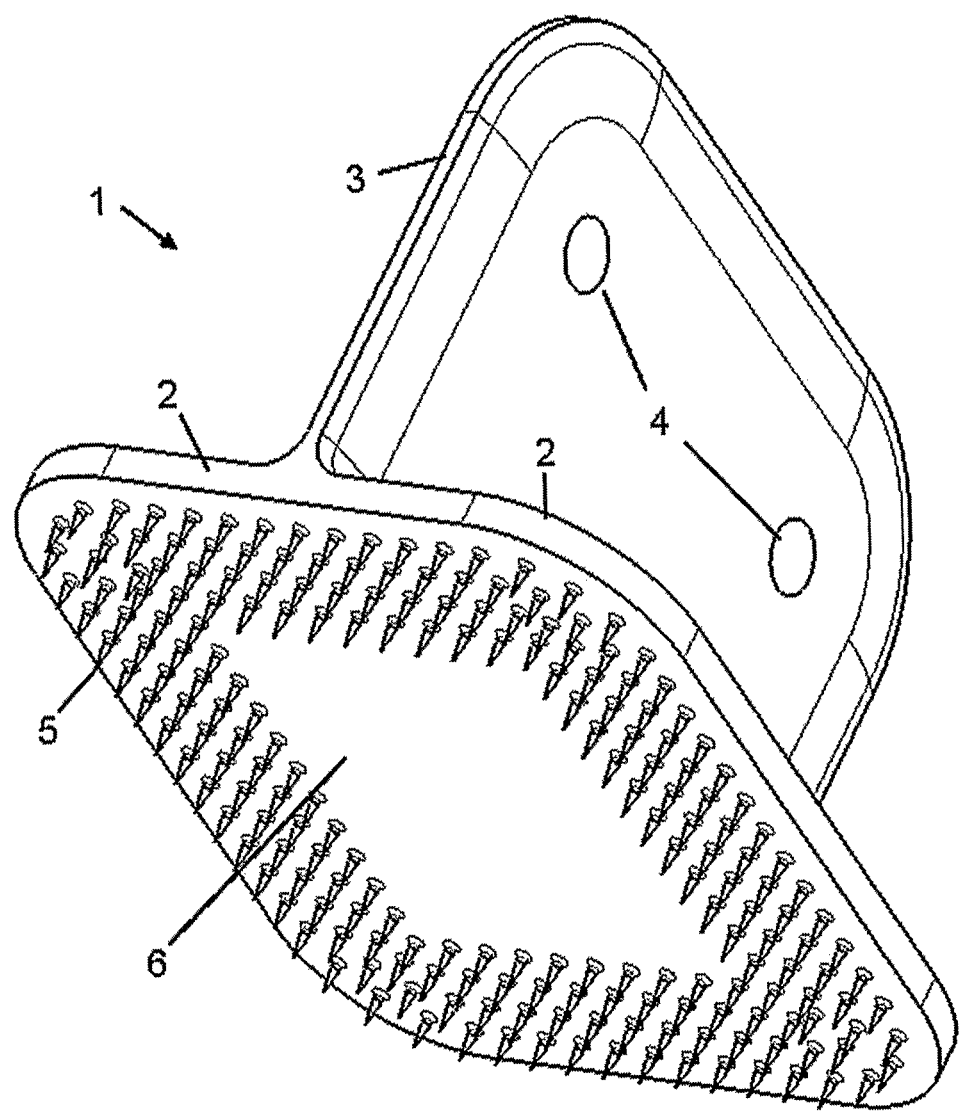
FIG. 1 is a perspective view of a floating rib foot.

A metallic floating rib foot 1 shown in FIG. 1 comprises a web portion 3 and a pair of flanges 2. The web portion 3 has a pair of fastener holes 4. An array of projections 5 extend from the underside of the flanges 2. As can be seen in FIG. 1, the projections 5 are distributed evenly over a bond region which extends around the periphery of the flanges 2 and surrounds a central region 6 with no projections.

Figure 2:
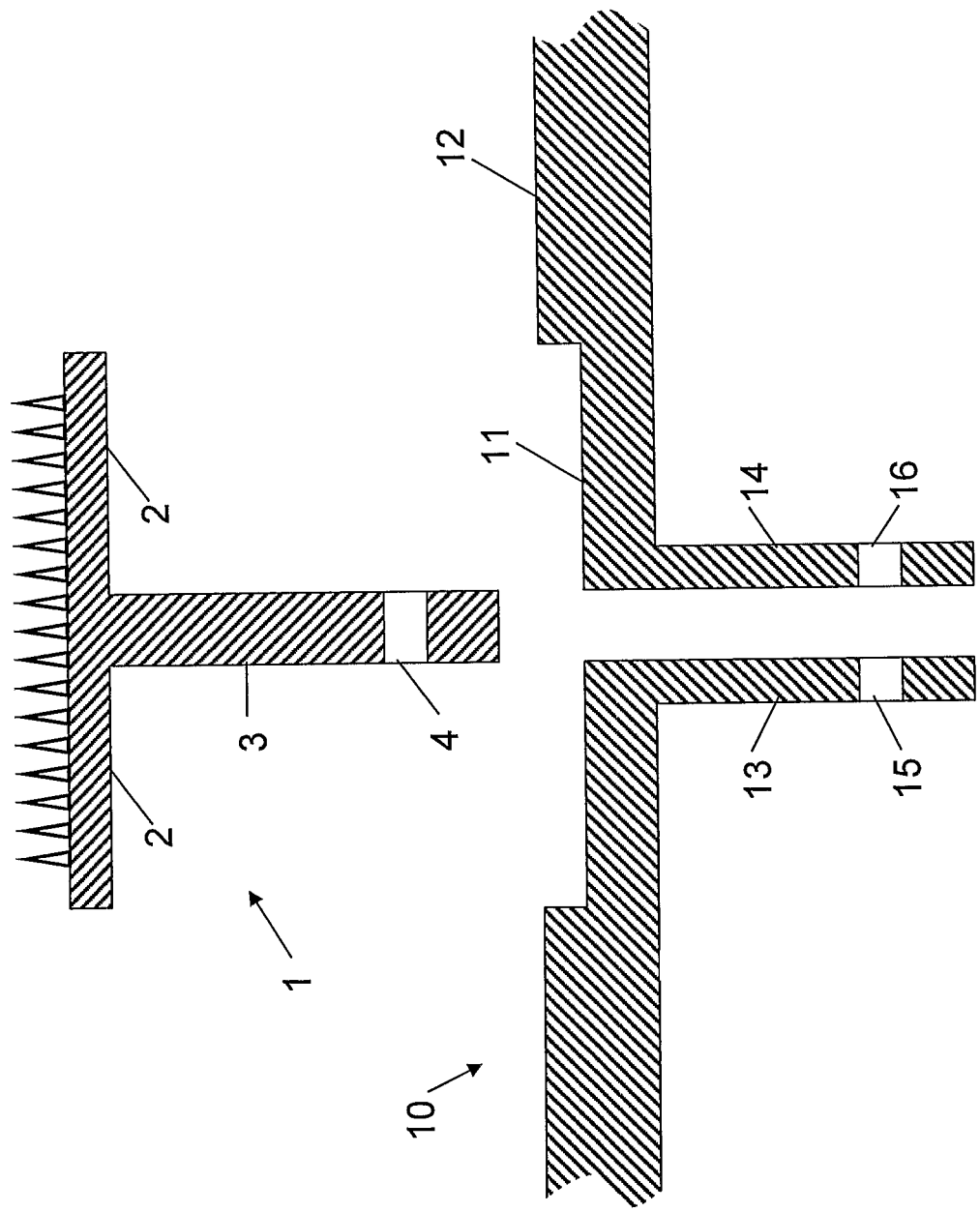
FIG. 2 is a cross sectional view showing the floating rib foot being integrated into a mould tool.
Figure 3:
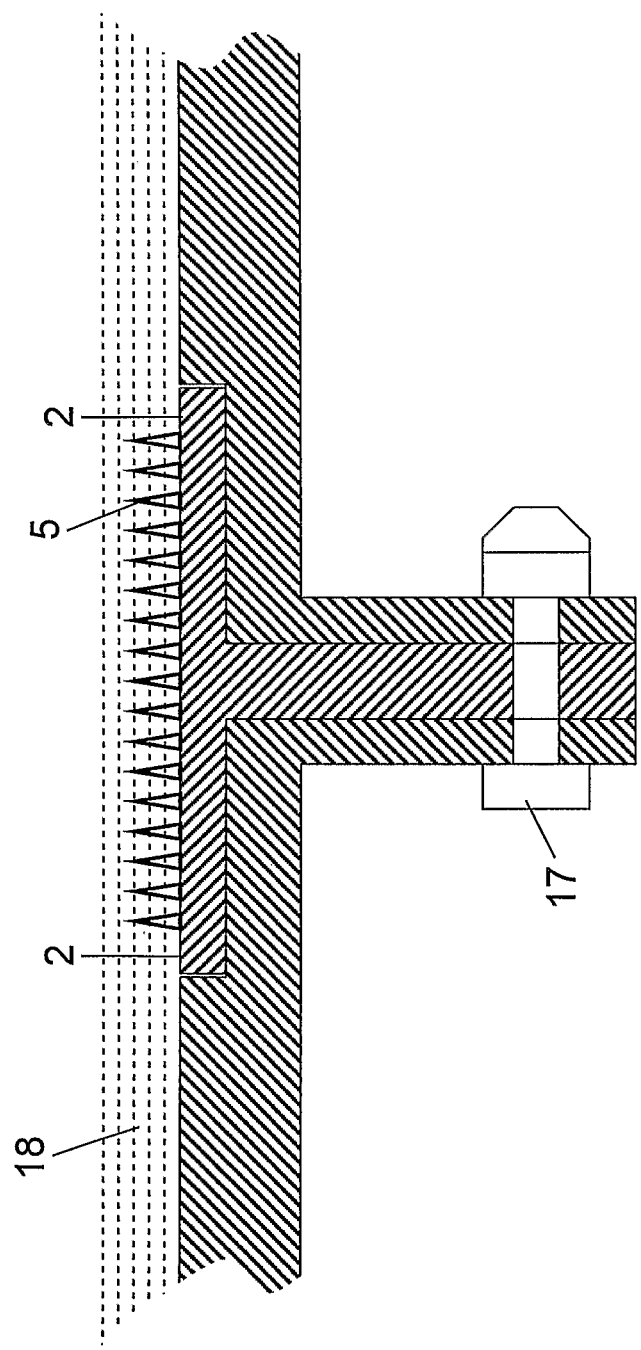
FIG. 3 is showing a composite lay-up on the mould tool.

The floating rib foot 1 is integrated into a mould tool 10 as shown in FIG. 2. The mould tool 10 has a mould surface 12 with a recess 11 which receives the flanges 2 as shown in FIG. 3. Web portion 3 extends into a channel between a pair of plates 13, 14, and is secured in place by a fastener 17 passing through a pair of holes 15, 16 in the plates 13, 14 as shown in FIG. 3. In the example of FIG. 3 only one fastener 17 is shown, but in alternative arrangements two or more fasteners may be used to secure the floating rib foot to the mould tool. In the case where two fasteners are used, then they may be passed through the holes 4 in the web portion 3.

After the floating rib foot 1 has been integrated into the mould tool 10, a composite lay-up 18 is laid onto the mould tool. The composite lay-up 18 comprises a series of plies of uni-axial carbon fibre, pre-impregnated with uncured epoxy resin. Each ply is conventionally known as a "prepreg". The initial prepregs are penetrated by the projections 5 as shown in FIG. 3.

After the lay-up 18 has been formed as shown in FIG. 3, it is cured and consolidated by a so-called "vacuum bagging" process. That is, the lay-up is covered by a vacuum membrane (and optionally various other layers such as a breather layer or peel ply); the vacuum membrane is evacuated to apply consolidation pressure and extract moisture and volatiles; and the lay-up is heated (optionally in an autoclave) to cure the epoxy resin matrix. As the epoxy resin matrix melts prior to cure, it flows into intimate contact with the projections 5. The projections 5 mechanically engage with the matrix, while also increasing the surface area of the bond.

Figure 4:
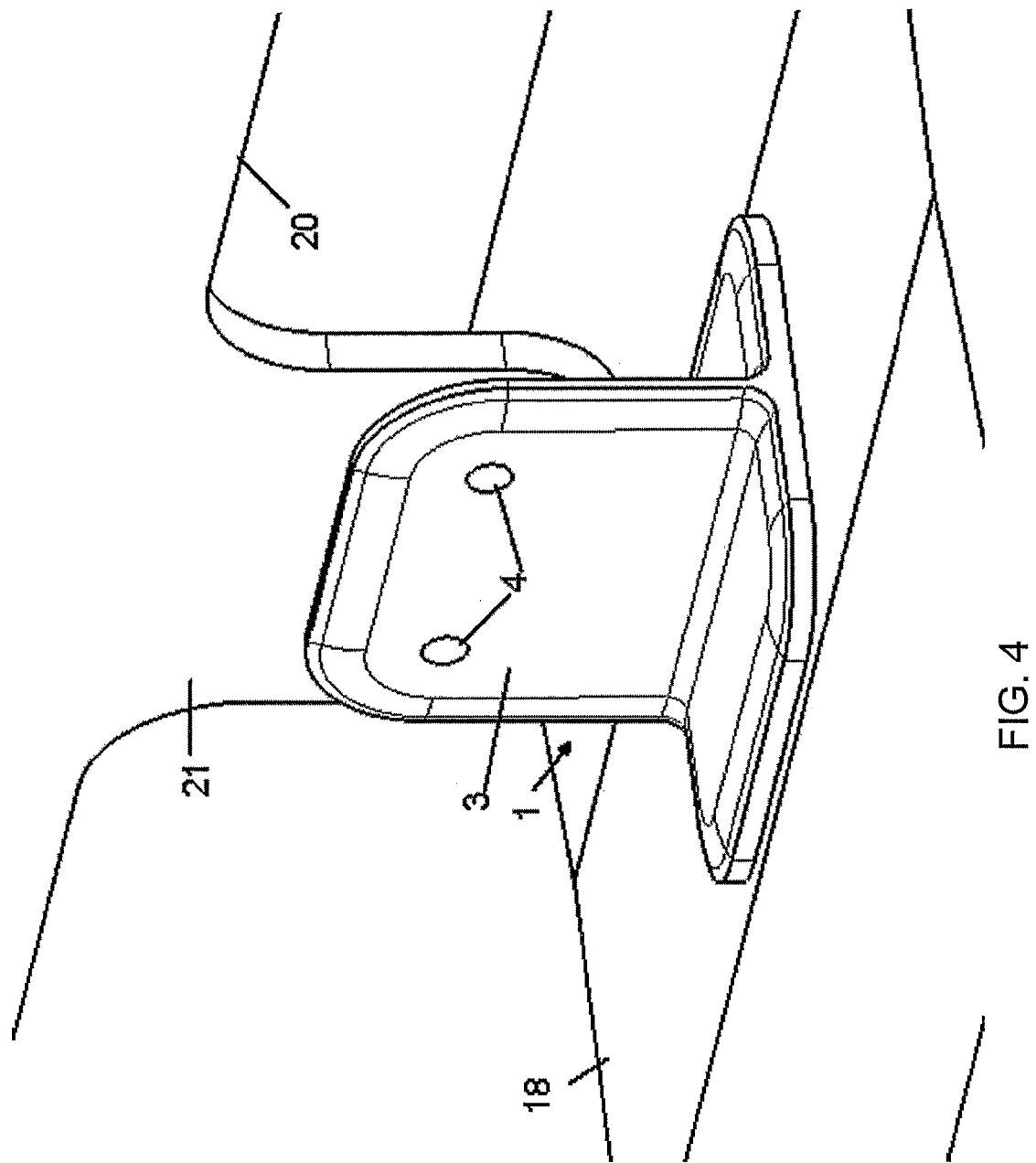
FIG. 4 is a perspective view showing the floating rib foot connecting a rib to a cover.

The components are then removed from the mould and assembled with various other wing box components as shown in FIG. 4. In this example the cured lay-up 18 is a wing cover, and the floating rib foot 1 secures a rib to the wing cover 18. The rib comprises a rib web 20 and a fixed rib foot 21 extending downwardly from the rib web 20. Fasteners (not shown) are passed through the fastening holes 4 in the web portion 3 of the floating rib foot 1 to secure the floating rib foot 1 to the fixed rib foot 20.

Figure 5:
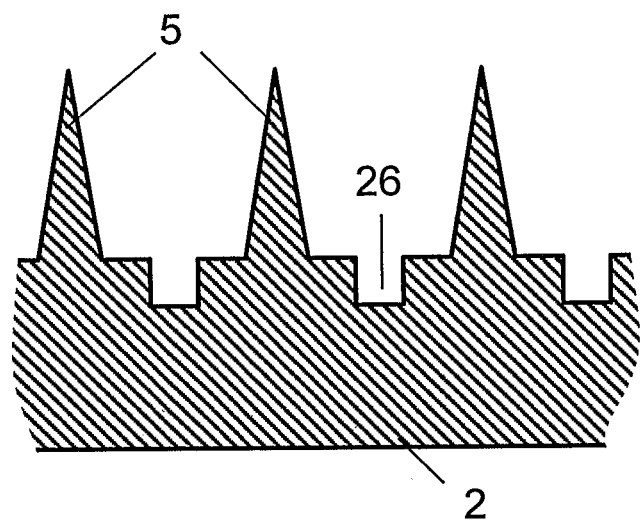
FIG. 5 is a cross-sectional view showing integral resin bleed channels on the floating rib foot.

As well as carrying projections 5, the lower surface of the flanges 2 may also be formed with resin bleed channels 26 shown in FIG. 5. Resin flows through the channels 26 during the curing process.

Figure 6:
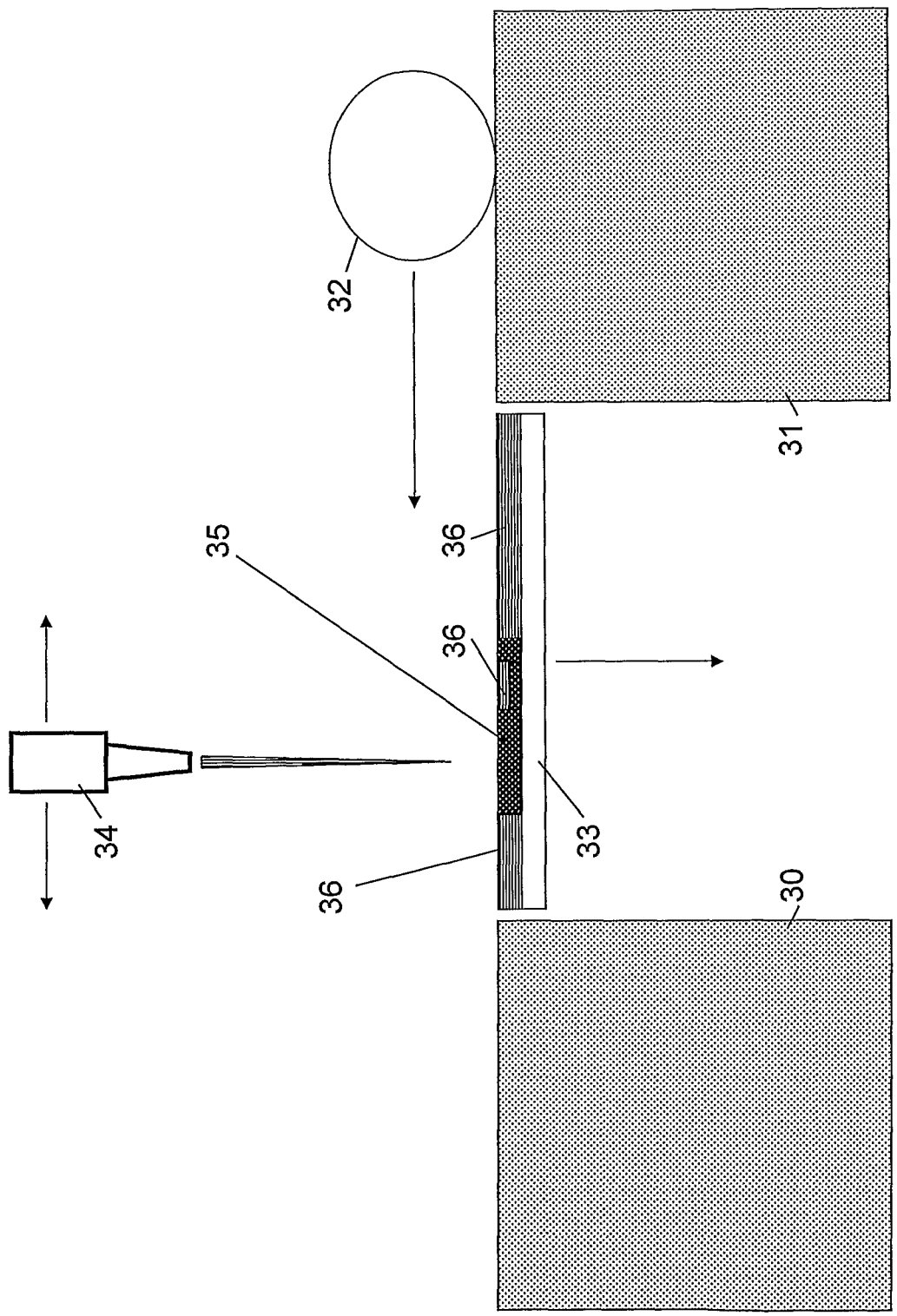
FIG. 6 is a schematic view of a powder bed fabrication system.
Figure 7:
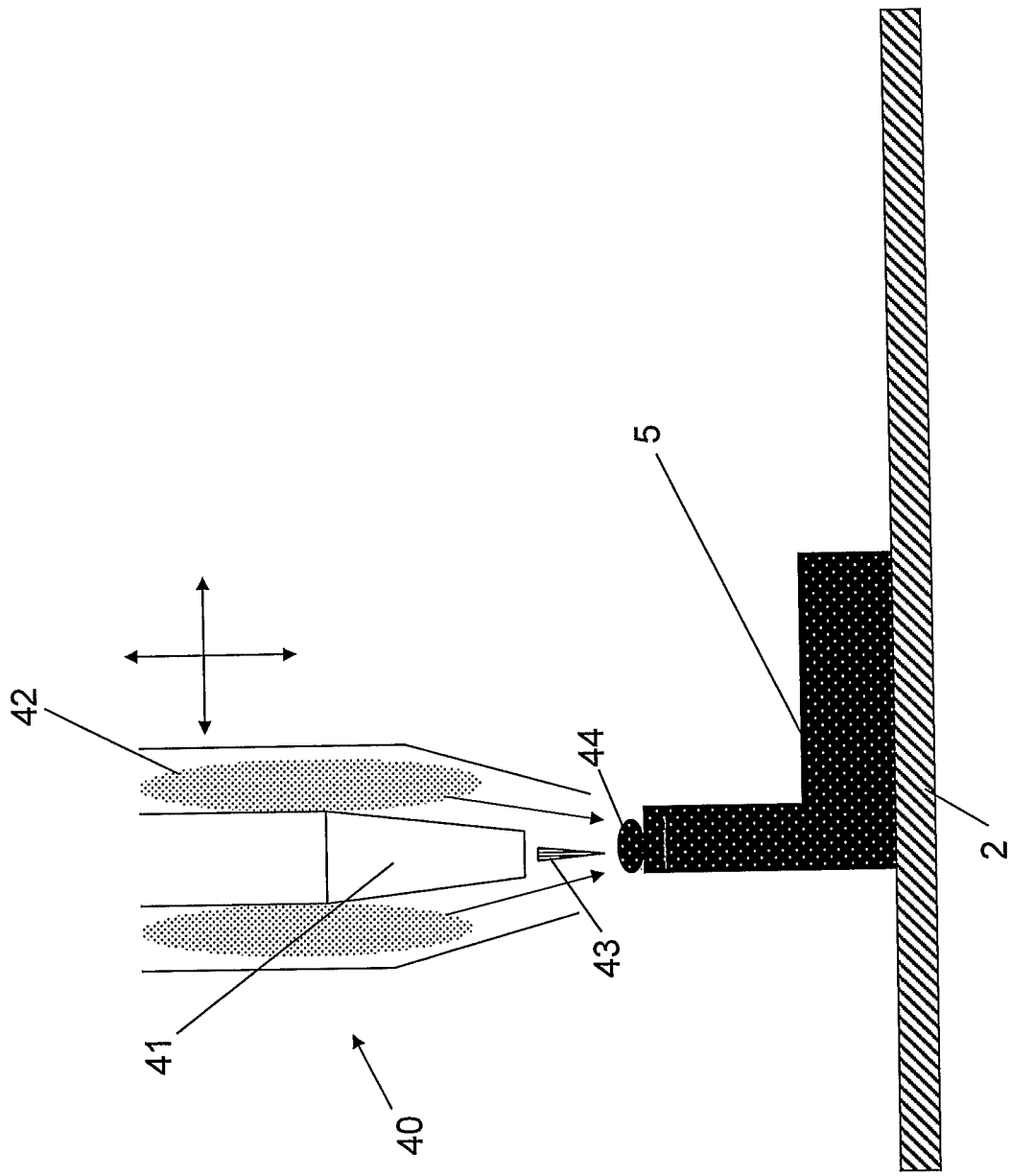
FIG. 7 is a schematic view of a powder feed fabrication system.

Each projection 5 is grown in a series of layers by an additive manufacturing process: either a powder bed process as shown in FIG. 6, or a powder feed process as shown in FIG. 7.

In the powder bed process shown in FIG. 6, the array of projections is formed by scanning a laser head laterally across a powder bed and directing the laser to selected parts of the powder bed. More specifically, the system comprises a pair of feed containers 30, 31 containing powdered metallic material such as powdered Titanium. A roller 32 picks up powder from one of the feed containers (in the example of FIG. 6, the roller 32 is picking up powder from the right hand feed container) and rolls a continuous bed of powder over a support member 33. A laser head 34 then scans over the powder bed, and a laser beam from the head is turned on and off to melt the powder in a desired pattern. The support member 33 then moves down by a small distance (typically of the order of 0.1 mm) to prepare for growth of the next layer. After a pause for the melted powder to solidify, the roller 32 proceeds to roll another layer of powder over support member 33 in preparation for sintering. Thus as the process proceeds, a sintered part 35 is constructed, supported by unconsolidated powder parts 36. After the part has been completed, it is removed from support member 33 and the unconsolidated powder 36 is recycled before being returned to the feed containers 30, 31.

The powder bed system of FIG. 6 can be used to construct the entire floating rib foot 1, including the web portion 3, flanges 2 and projections 5. Movement of the laser head 34 and modulation of the laser beam is determined by a Computer Aided Design (CAD) model of the desired profile and layout of the part.

The powder feed fabrication system shown in FIG. 7 can be used to build up the projections 5 on a previously manufactured floating rib foot. That is, the web portion 3 and flanges 2 have been previously manufactured before being mounted in the powder feed fabrication mechanism.

A projection 5 is shown being built up on the underside of one of the flanges 2 in FIG. 7. The powder feed fabrication system comprises a movable head 40 with a laser 41 and an annular channel 42 around the laser 41. Un-sintered powder flows through the channel 42 into the focus of the laser beam 43. As the powder is deposited, it melts to form a bead 44 which becomes consolidated with the existing material.

The powder feed system may be used to grow the projections in series, or in parallel. More specifically, the projections may be grown in parallel by the following sequence:

P(1)L(1), P(2)L(1), ... P(n)L(1), P(1)L(2), P(2)L(2), ... P(n)L(2) ... etc.

or in series by the following sequence:

P(1)L(1), P(1)L(2), ... P(1)L(m), P(2)L(1), P(2)L(2), ... P(2)L(m) ... etc.

where P(X) L(Y) represents the growth of a layer X of a projection Y.

This can be contrasted with the powder bed system which can only grow the projections in parallel.

In contrast to the powder bed system of FIG. 7, the powder feed system of FIG. 6 directs powder to only the selected parts of the bond region, and fuses the powder as it is delivered. Therefore the powder feed mechanism produces structures that are unsupported by powder, and so supports (not shown) may need to be built integrally into the part and machined off later, in particular where the projections have large overhanging parts.

The head 40 may be the only moving feature in the process, or the part may be rotated during fabrication. In other words, the head 40 directs powder to selected parts of the bond region with the part in a first orientation relative to the head 40; the part is rotated so that it adopts a second orientation relative to the head 40; and the head then directs material to selected parts of the bond region with the part in the second orientation. This facilitates the manufacturing of complex shapes without the need for removable supports. For instance overhanging features can be formed by rotating the part between layers in order to always ensure that the element being built is at no more than 30 degrees from the vertical. As the build area is at a temperature significantly below the melting point of the material, the area being built will only need to maintain a supportable angle for a brief time after the laser energy is removed in order for it to solidify enough to become self supporting. If the projections are built in a parallel sequence then it is possible to re-orientate the part between each layer to enable unsupported overhanging features to be built.

Figure 8:
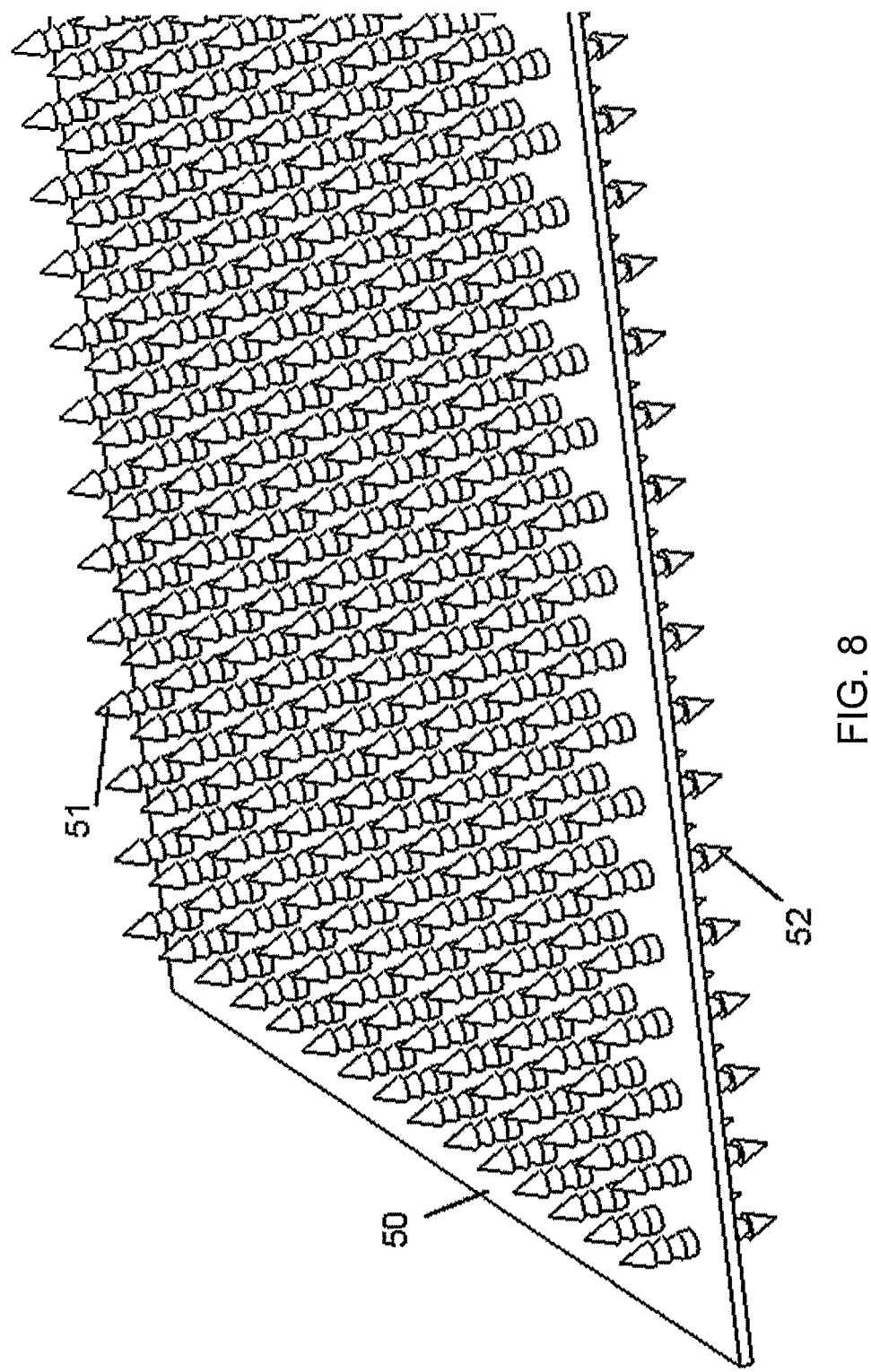
FIG. 8 is a perspective view of a first interfacing strip.

FIG. 8 shows an interfacing strip 50 with an upper face carrying an array of projections 51 for joining the interfacing strip to an upper workpiece, and an opposite lower face with an array of projections 52 for joining the interfacing strip to a lower workpiece. The interfacing strip and projections may be manufactured by the powder bed process of FIG. 6, or the projections may be built onto a prefabricated strip using the powder feed process of FIG. 7.

Figure 9:
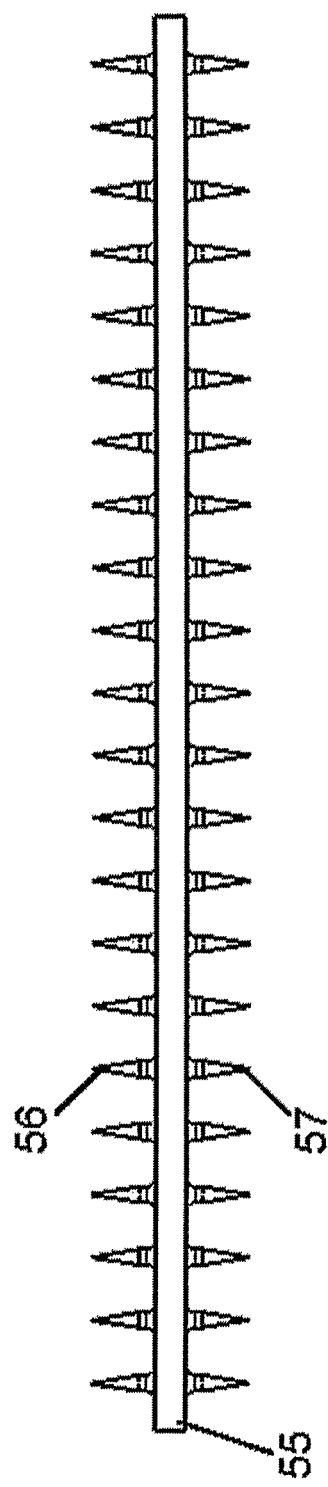
FIG. 9 is a side view of a second interfacing strip.
Figure 10:
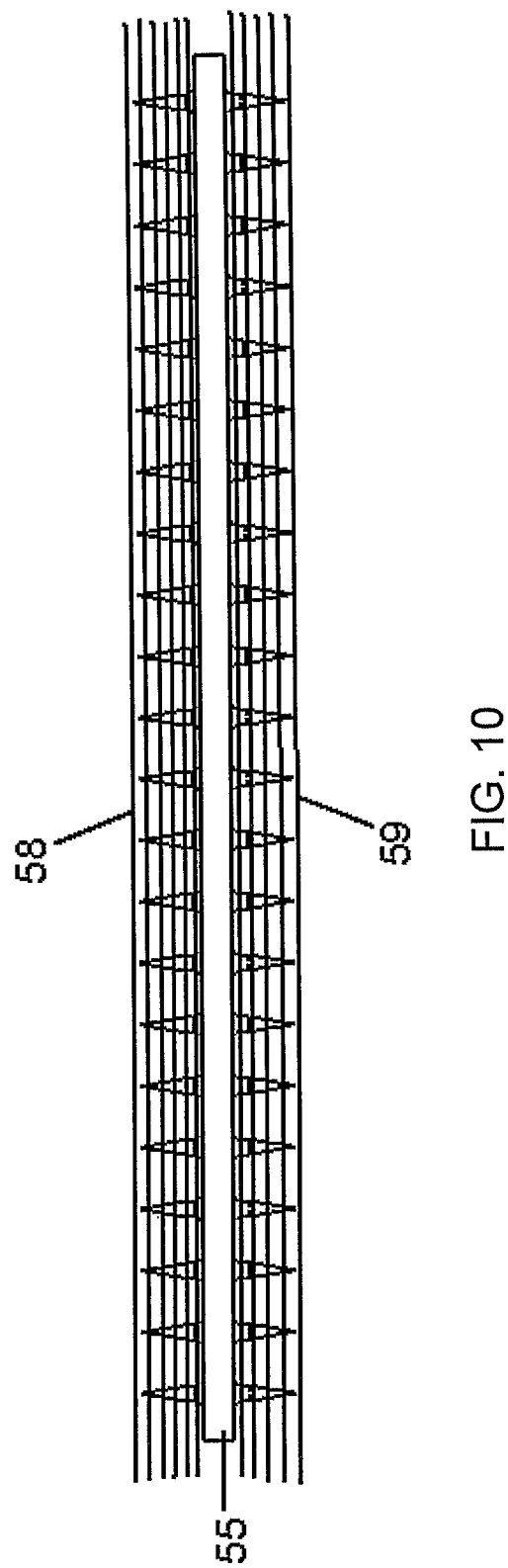
FIG. 10 is a cross-sectional view showing the second interfacing strip connecting a pair of composite workpieces.

FIG. 9 shows an interfacing strip 55 with upper and lower arrays of projections 56, 57. The interfacing strip 55 is shown in FIG. 10 joining an upper workpiece 58 to a lower workpiece 59. The interfacing strip 55 is particularly useful where significant through-thickness stresses are acting to pull the workpieces 58,59 apart. The penetration of the projections into the workpieces 58,59 provides a significant increase in the strength of the joint when it is subject to tensile, peel or cleavage loads.

The joint shown in FIG. 10 may be manufactured in a number of ways, including:
  pressing the interfacing strip 55 into one of the workpieces (using a vibrating hammer or roller); then pressing the other workpiece onto the exposed projections of the interfacing strip (using the vibrating hammer or roller); or
  joining the interfacing strip with a first one of the workpieces using a method similar to that shown in FIGS. 2 and 3; co-curing the interfacing strip and first workpiece; pressing the second (uncured) workpiece onto the exposed projections of the interfacing strip (using a vibrating hammer or roller); and then curing the second workpiece; or
  joining the interfacing strip with a first one of the workpieces using a method similar to that shown in FIGS. 2 and 3; co-curing the interfacing strip and first workpiece; integrating the co-cured interfacing strip and first workpiece into a second mould; laying up the second workpiece onto the second mould using a method similar to that shown in FIG. 2; and curing the second workpiece.

Figure 11:
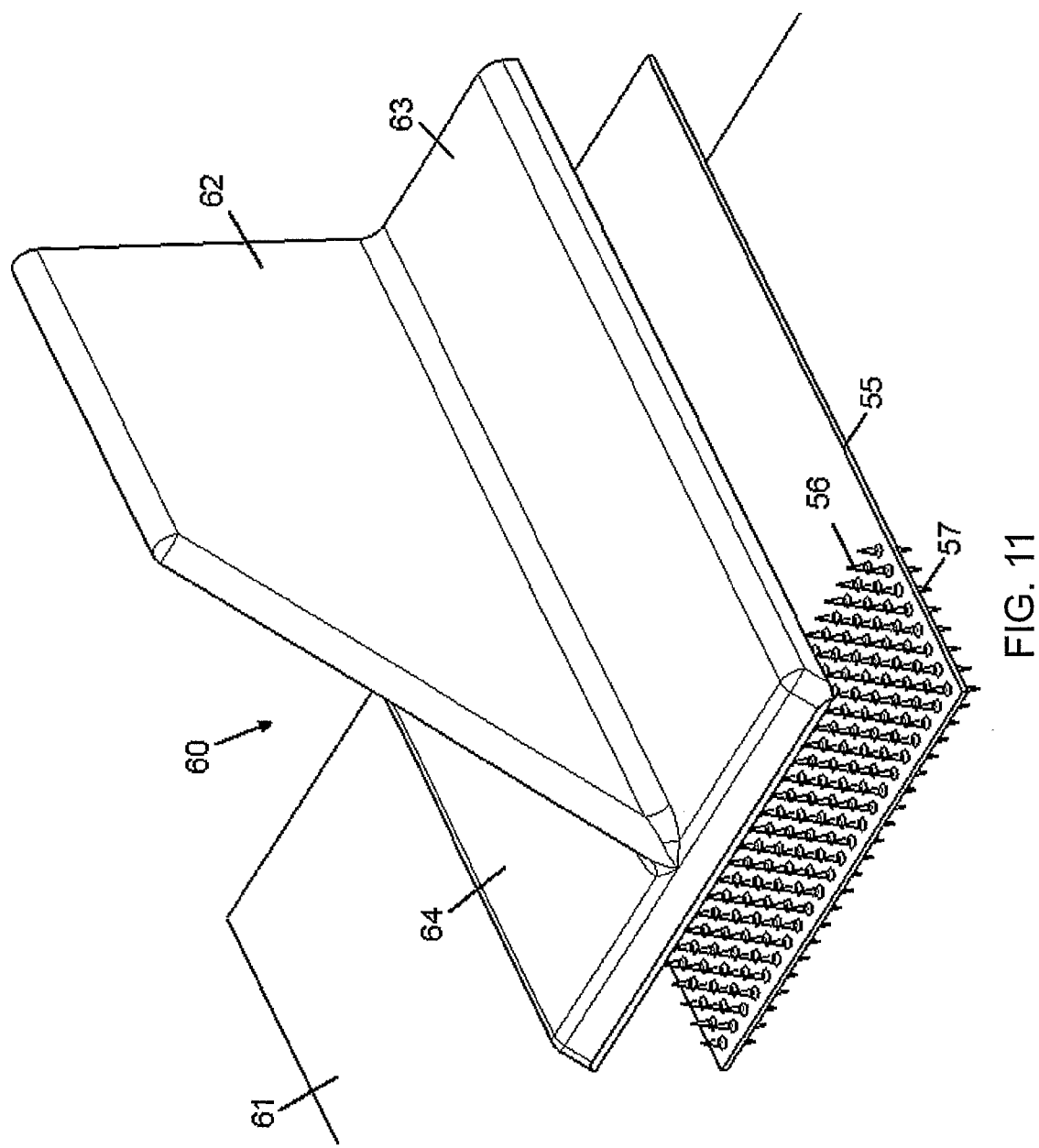
FIG. 11 is a perspective exploded view showing a stringer run-out being joined to a cover by an interfacing strip.
Figure 12:
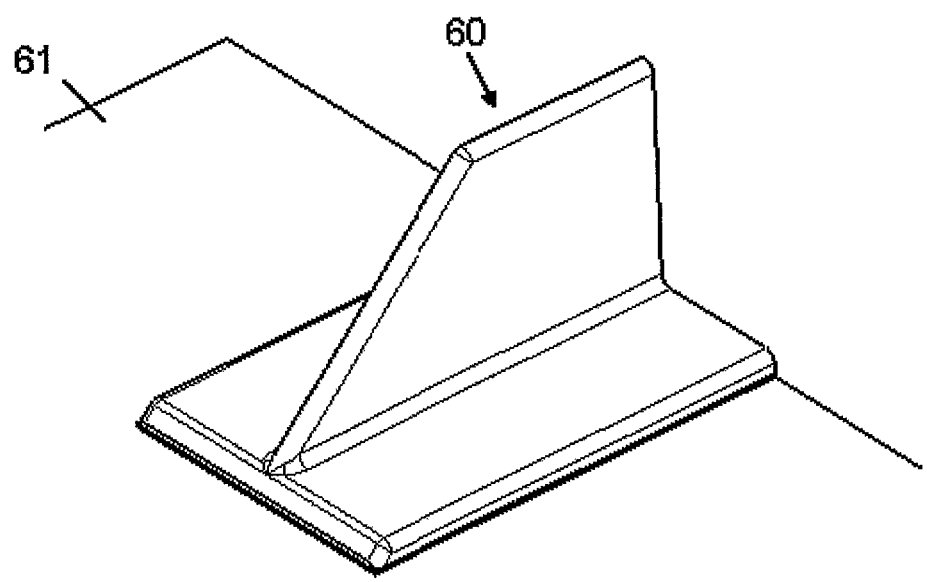
FIG. 12 is a perspective view of the stringer run-out joined to the cover.

An example of the use of the interfacing strip 55 is shown as an exploded view in FIG. 11. Note that in FIG. 11 the bond region carrying the projections 56, 57 is at one end of the interfacing strip 55 only. In this case, the lower workpiece is a wing cover 61 and the upper workpiece is a stringer run-out 60 comprising a pair of flanges 63, 64 and a blade portion 62. FIG. 12 shows the stringer run-out 60 joined to the cover 61 by the interfacing strip (which is not visible in FIG. 12).

Figure 13:
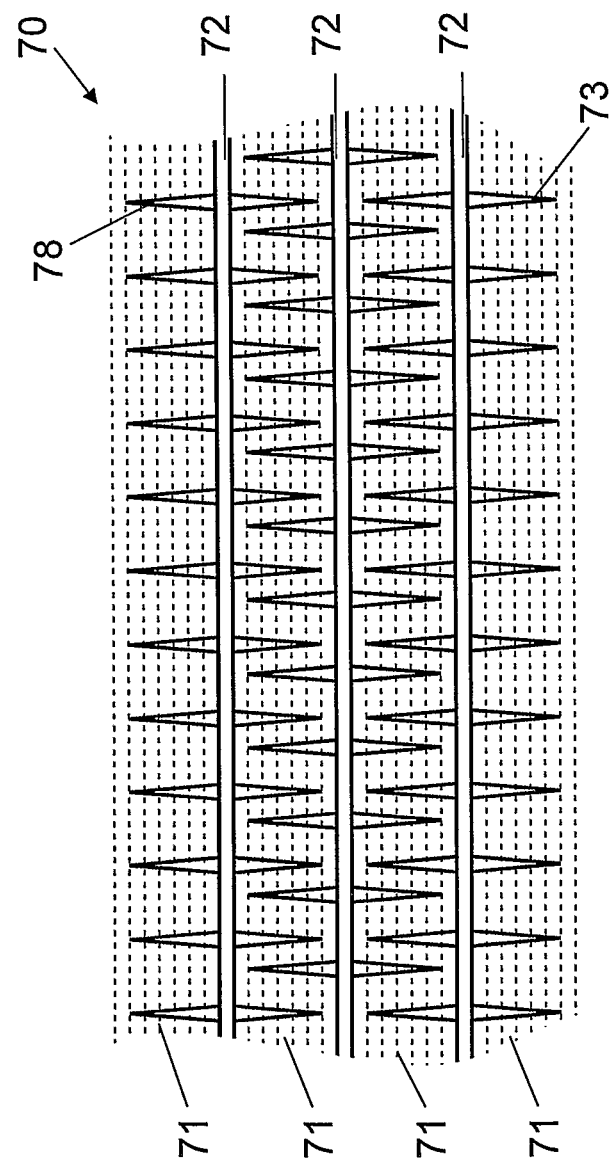
FIG. 13 is a cross-sectional view of a fibre-metal laminate with metal layers incorporating surface features.

A fibre-metal laminate 70 is shown in FIG. 13 in cross-section. The laminate 70 comprises a series of layers of carbon-fibre reinforced polymer (CFRP) 71 interleaved with layers of Titanium 72. Each Titanium layer 72 carries an array of projections 73 on its lower surface and an array of projections 78 on its upper surface, each array of projections being embedded in the adjacent CFRP layer.

Figure 16:
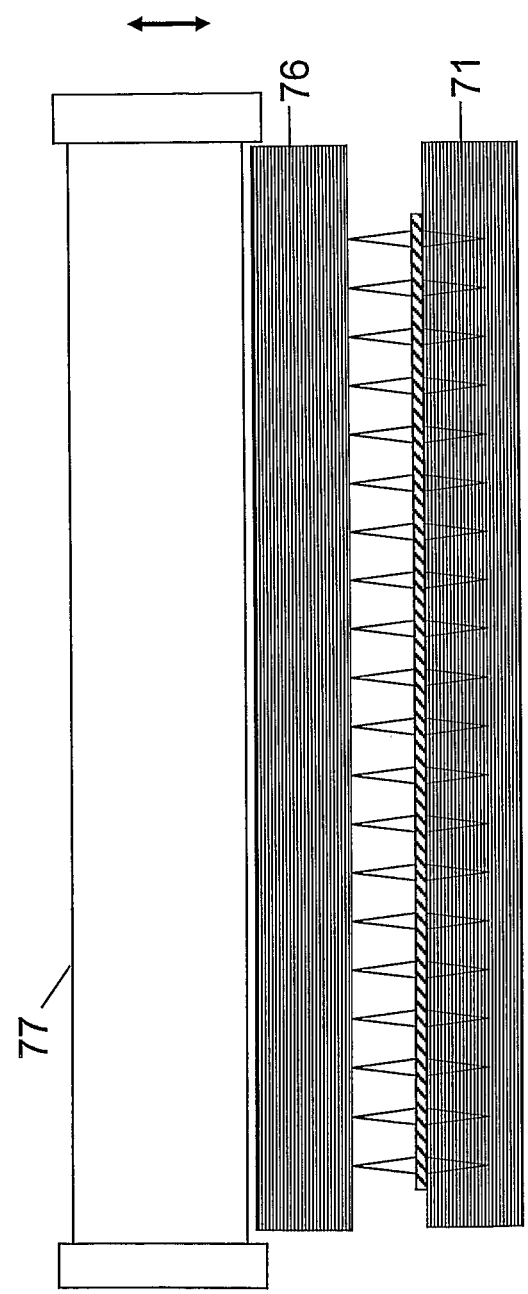
FIG. 16 is an end view showing a subsequent step in the method of fabricating the fibre-metal laminate.

The laminate 70 is fabricated using the process shown in FIGS. 14-16. In an initial step, a first CFRP layer 71 is laid up (for instance as a stack of prepregs) on a mould tool (not shown). A first Titanium layer 72 is then laid onto the CFRP layer 71 with its lower projections 73 engaging the upper surface of the CFRP layer 71 as shown in FIG. 15. A roller 74 carrying a series of annular ridges 75 with the same spacing as the upper projections 78 is then applied to the upper surface of the layer 72. The upper projections 78 are each received in a channel between an adjacent pair of ridges 75 as shown in FIG. 14. The roller 74 is then rolled over the interfacing strip, and vibrated to agitate the projections 73 as they penetrate into the uncured CFRP layer 71 as shown in FIG. 14. The roller 74 may be rolled back and forth in a number of passes to fully embed the projections 73 in the CFRP layer 71.

A second CFRP layer 76 is then laid on top of the layer 72 as shown in FIG. 16, and a second roller 77 (without ridges) is rolled over the second CFRP layer 76 and vibrated to press the upper projections 78 into the second CFRP layer 76. The process is then repeated to form a series of pairs of layers as shown in FIG. 13. Note that the projections for each Titanium layer 72 are offset from the previous layer.

Figure 17:
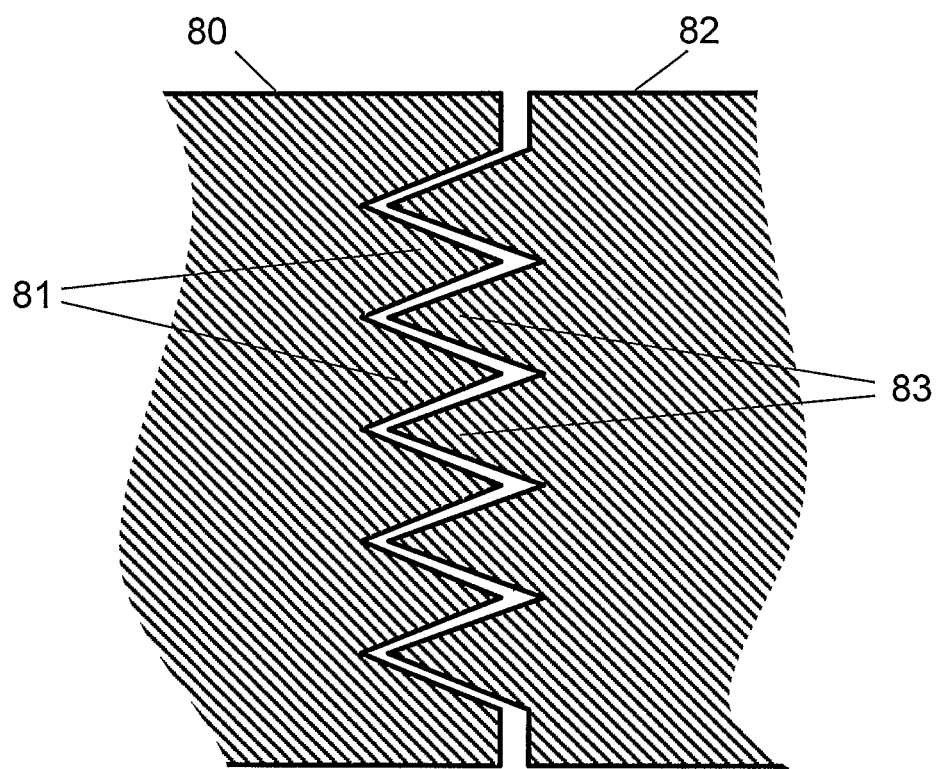
FIG. 17 is a cross-sectional view of a metal-metal joint.

A metal-metal joint is shown in FIG. 17. A first workpiece 80 is formed with a series of projections 81. A second workpiece 82 is formed with a set of complementary projections 83 which interlock with the projections 81 as shown. A thin layer of adhesive (not shown) is provided in the gap between the work pieces, sealing them together in the manner of a tongue-and-groove joint.

The workpieces 80,82 and projections 81,83 may be manufactured by the powder bed process of FIG. 6, or the projections 81,83 may be built onto prefabricated workpieces using the powder feed process of FIG. 7.

Figure 18:
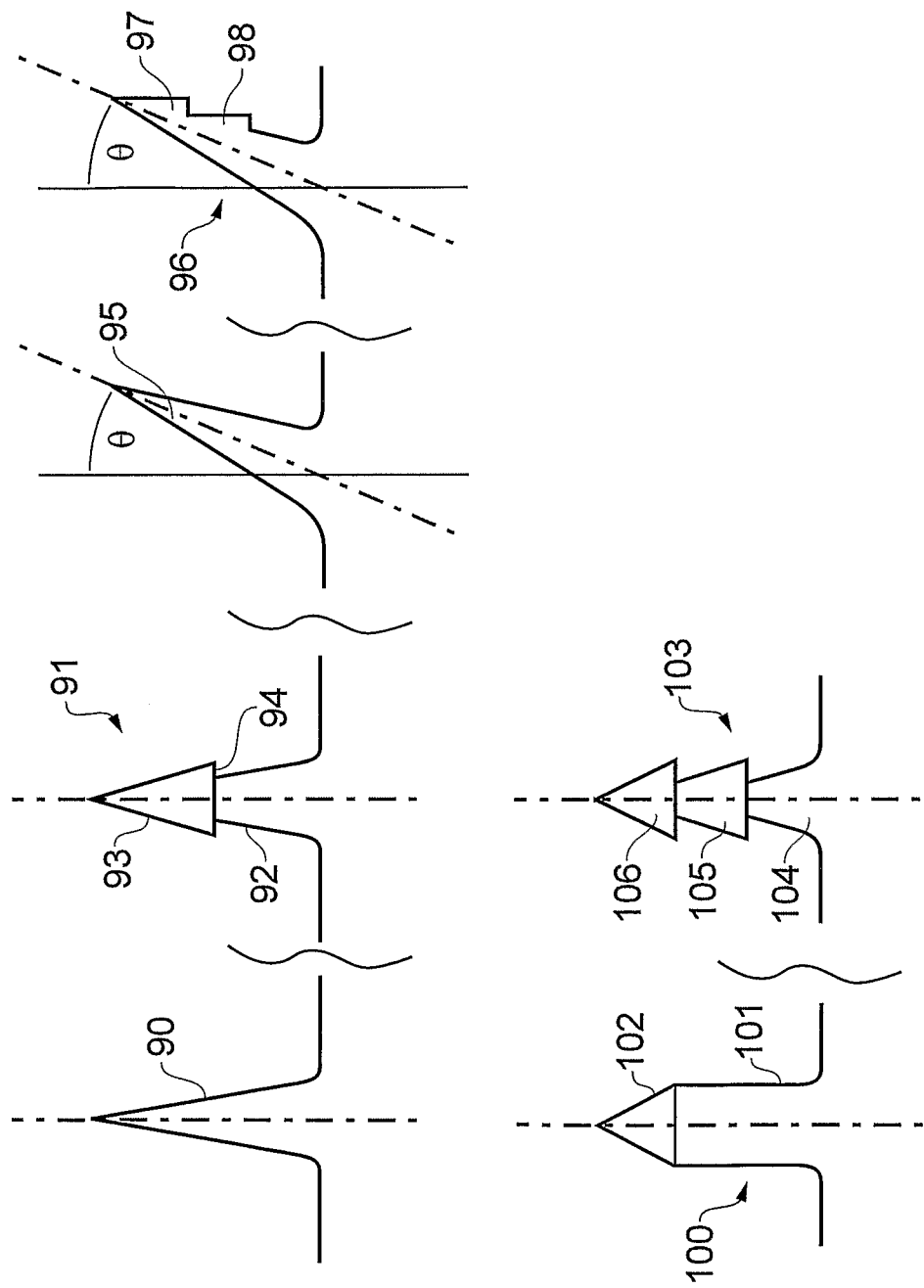
FIG. 18 shows a set of alternative projection profiles.

Various alternative projection profiles are shown in FIG. 18 which can be manufactured by additive layer manufacturing and used in any of the joints described above. Projection 90 comprises a conical spike. Projection 91 comprises a frustoconical base 92 and a conical tip 93 with an overhanging edge 94. Projection 95 comprises a cone which leans by an angle of θ to the vertical. Projection 96 comprising a cone leaning at an angle of θ to the vertical, with a pair of ridges 97, 98 on its overhanging side. Projection 100 comprises a cylindrical base 101 and a conical tip 102. Projection 103 comprises a frustoconical base 104, a frustoconical part 105 with an overhanging edge, and a conical tip 106 with an overhanging edge.

Note that the aspect ratios of the projections are relatively high, giving firm mechanical engagement and a high surface area. If we define the aspect ratio as H/W, where H is the height perpendicular to the bond region of the component and W is the average width parallel to the bond region, then the aspect ratio varies between approximately 3.5 (for the projection 100) and 5 (for the projections 90 and 95). The aspect ratio of the projections may be increased or decreased to give the desired properties.

The various geometries shown in FIG. 18 may be selected to maximise the performance of the joint, and tailored to the specific loading that it is subjected to. Thus for example:
- projections 91, 96 and 103 (all of which include a part with an overhanging edge) may be used in a joint (or a selected part of a joint) that requires enhanced pull-off (tensile) strength;
- an asymmetrical projection 95 or 96 may be used to improve properties in a particular load direction; and
- each of the projections have pointed tips to enable them to penetrate easily into the composite material.

Although the invention has been described above with reference to one or more preferred embodiments, it will be appreciated that various changes or modifications may be made without departing from the scope of the invention as defined in the appended claims.

The invention claimed is:

1. A method of joining a pair of components, the method comprising the steps of:
   preparing a first component of said pair of components by growing an array of projections on a bond region of the first component, wherein each projection is grown in a series of layers by an additive fabrication process, each of said layers is grown by at least one of directing energy and material from a head to at least one selected part of the bond region;
   joining the components by embedding the array of projections from said first component in the second of said components; and
   hardening the second of said components after the array of projections has been embedded.

2. The method of claim 1 further comprising causing relative movement between the head and the bond region during the growing step.

3. The method of claim 1 wherein during the preparation step, the head directs material to selected parts of the bond region.

4. The method of claim 1 wherein the preparing step includes the steps of:
   directing material to selected parts of the bond region of said first component in a first orientation relative to the head;
   rotating the first component to adopt a second orientation relative to the head; and
   directing material to selected parts of the bond region with the first component in the second orientation.

5. The method of claim 1 wherein during the preparation step, the head directs energy to fuse the material as it is directed to the bond region.

6. The method of claim 1 wherein the projections are formed by depositing a series of beds of material on the bond region; and directing energy from the head to selected parts of each bed.

7. The method of claim 1 wherein the projections are formed by fusing a powder.

8. The method of claim 1 wherein said preparing step includes growing the first component in a series of layers, each layer being grown by at least one of directing energy and/or material from a head to selected parts of a build surface.

9. The method of claim 1, wherein said joining step further comprising the step of vibrating at least one of the array of projections and the second component to assist penetration.

\* \* \* \* \*